US011330520B2

(12) United States Patent
Alanen et al.

(10) Patent No.: US 11,330,520 B2
(45) Date of Patent: May 10, 2022

(54) WAKING UP A DOZING WIRELESS DEVICE

(71) Applicant: Nokia Technologies Oy, Espoo (FI)

(72) Inventors: Olli Alanen, Espoo (FI); Mika Kasslin, Espoo (FI); Janne Marin, Espoo (FI); Enrico Henrik Rantala, Berkeley, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 65 days.

(21) Appl. No.: 16/473,017

(22) PCT Filed: Jan. 3, 2017

(86) PCT No.: PCT/US2017/012011
§ 371 (c)(1),
(2) Date: Jun. 24, 2019

(87) PCT Pub. No.: WO2018/128595
PCT Pub. Date: Jul. 12, 2018

(65) Prior Publication Data
US 2019/0320389 A1 Oct. 17, 2019

(51) Int. Cl.
*H04W 52/02* (2009.01)
*H04L 27/02* (2006.01)
*H04W 72/04* (2009.01)

(52) U.S. Cl.
CPC ......... *H04W 52/0229* (2013.01); *H04L 27/02* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| 9,525,540 B1 | 12/2016 | Shellhammer et al. |
| 2012/0218979 A1 | 8/2012 | Yeh et al. |

(Continued)

FOREIGN PATENT DOCUMENTS

WO 2018/111305 A1 6/2018

OTHER PUBLICATIONS

Office Action for Chinese Application No. 20178082020.X dated May 19, 2020, 9 pages.

(Continued)

*Primary Examiner* — Rebecca E Song
(74) *Attorney, Agent, or Firm* — Alston & Bird LLP (57) ABSTRACT

Disclosed is an apparatus, computer program product, and method for determining to transmit frames on a frequency channel; determining a first sub-band of the frequency channel for wake-up radio transmissions according to a wake-up radio access technology and a second sub-band of the frequency channel, different from the first sub-band, for main radio transmissions according to another radio access technology; allocating the first sub-band for the wake-up radio transmissions and simultaneously allocating the second sub-band for the main radio transmissions; transmitting, using a main radio interface of an access network (AN), using said another radio access technology, a frame comprising a header indicating said allocations, and transmitting, after transmitting the header, a wake-up signal on the first sub-band by using a wake-up radio interface of the AN operating according to the wake-up radio access technology and, simultaneously, transmitting another radio signal on the second sub-band using the main radio interface.

14 Claims, 7 Drawing Sheets

(56) References Cited

U.S. PATENT DOCUMENTS

| | | | |
|---|---|---|---|
| 2015/0208253 A1 | 7/2015 | Kim et al. | |
| 2015/0319689 A1* | 11/2015 | Zhang | H04W 40/005 370/311 |
| 2015/0351125 A1* | 12/2015 | Kwon | H04W 74/002 370/336 |
| 2016/0127918 A1* | 5/2016 | Yi | H04W 16/26 370/329 |
| 2016/0174280 A1 | 6/2016 | Singh et al. | |
| 2016/0374019 A1 | 12/2016 | Park et al. | |
| 2016/0374020 A1* | 12/2016 | Azizi | H04W 52/0229 |
| 2017/0280498 A1* | 9/2017 | Min | H04L 5/0053 |
| 2018/0115953 A1* | 4/2018 | Shellhammer | H04W 52/028 |
| 2019/0261268 A1* | 8/2019 | Zhou | H04W 36/26 |

OTHER PUBLICATIONS

Extended European Search Report for Application No. 17889930.8 dated Aug. 12, 2020, 11 pages.
"Low-Power Wake-Up Receiver (LP-WUR) for 802.11", doc.: IEEE 802.11-15/1307r1, Nov. 2015, pp. 1-18.
"LP-WUR (Low-Power Wake-Up Receiver) Follow-Up", doc.: IEEE 802.11-16/0341r0, Mar. 2016, pp. 1-9.
International Search Report and Written Opinion received for corresponding Patent Cooperation Treaty Application No. PCT/US2017/012011, dated May 10, 2017, 30 pages.
Office Action for Chinese Application No. 20178082020.X dated Feb. 2, 2021, 11 pages.
First Examination Report for Indian Application No. 201947024806 dated May 10, 2021, 8 pages.

\* cited by examiner

WAKING UP A DOZING WIRELESS DEVICE

RELATED APPLICATION

This application was originally filed as Patent Cooperation Treaty Application No. PCT/US2017/012011 filed 3 Jan. 2017.

FIELD

The invention relates to the field of wireless communications and, particularly, to contacting a dozing wireless device.

BACKGROUND

Wireless networks employ various power-saving features to reduce power consumption in battery-operated devices such as mobile devices. Networks based on IEEE 802.11 (Wi-Fi) specifications have introduced a power-save mode where a device may temporarily shut down its Wi-Fi interface to reduce the power consumption. Many other networks employ similar power-save modes that allow a battery-operated device to "doze" between frame transmissions or when there is no data to deliver. In the dozing state, the Wi-Fi or another main radio interface of the battery-operated device may be temporarily shut down. The dozing may have to be cancelled from time to time, e.g. for receiving information from the wireless network. The information may be provided in a beacon signal or another periodic broadcast signal, for example. There may be other reasons that cancel the dozing and cause the device to activate its main radio interface for a frame transmission/reception.

BRIEF DESCRIPTION

According to an aspect, there is provided the subject matter of the independent claims.

Embodiments of the invention are defined in dependent claims.

LIST OF DRAWINGS

Embodiments of the present invention are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
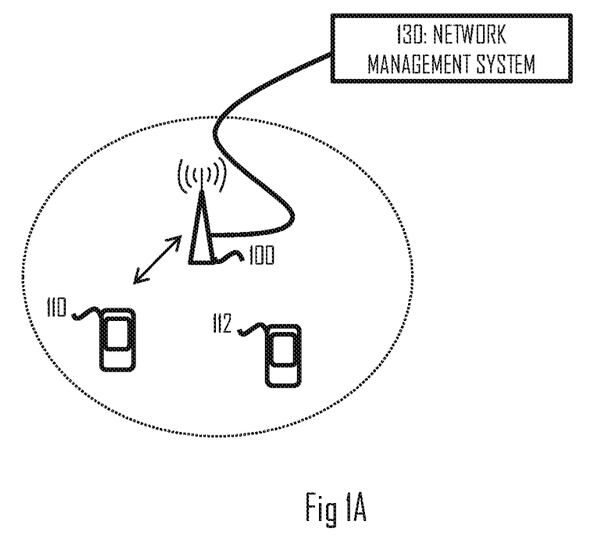
FIG. 1A illustrates an example of a wireless communication scenario to which embodiments of the invention may be applied.

A general wireless communication scenario to which embodiments of the invention may be applied is illustrated in FIG. 1A. FIG. 1A illustrates wireless communication devices comprising an access point (AP) 100 and a plurality of wireless terminal devices (STA) 110, 112. The access point may be associated with a basic service set (BSS) which is a basic building block of an IEEE 802.11-based wireless local area network (WLAN). The most common BSS type is an infrastructure BSS that includes a single AP together with all STAs associated with the AP. The AP may be a fixed AP or it may be a mobile AP. The AP 100 may also provide access to other networks, e.g. the Internet. In another embodiment, the BSS may comprise a plurality of APs to form an extended service set (ESS). In yet another embodiment, a terminal device 110 may establish and manage a peer-to-peer wireless network to which one or more other terminal devices 112 may associate. In such a case, the peer-to-peer wireless network may be established between two or more terminal devices and, in some embodiment, the terminal device managing the network may operate as an access node providing the other terminal device(s) with a connection to other networks, e.g. the Internet. In other embodiments, such routing functionality is not employed and the connection terminates in the terminal devices. Such a peer-to-peer network may be utilized for data sharing or gaming, for example.

The access node 100 may be connected to a network management system (NMS) 130 which may comprise an apparatus configured to maintain channel usage information of wireless networks of one or more access nodes and to configure the channel usage of the wireless networks. For example, it may arrange wireless networks located close to each other to operate on different channels and, thus, avoid interference between the networks. An example scenario is that access nodes of an enterprise are all controlled by the same NMS 130. In an embodiment, the network management system 130 is comprised in one of the access nodes, e.g. in the access node 100. In another embodiment, the network management system is realized by an apparatus different from the access nodes, e.g. by a server computer to which the access nodes may connect via a wired or wireless connection.

While embodiments of the invention are described in the context of the above-described topologies of IEEE 802.11 specifications, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), LTE-Advanced, a fifth generation cellular communication system (5G), and other networks having cognitive radio features, e.g. transmission medium sensing features and adaptiveness to coexist with radio access networks based on different specifications and/or standards. Some embodiments may be applicable to networks having features defined in the IEEE 802.19.1 specification. One example of a suitable communications system is the 5G system, as mentioned above.

With respect to the definition of the wireless network in the context of the present description, the wireless network may comprise a single BSS or a plurality of BSSs. According to a viewpoint, the wireless network may comprise a plurality of BSSs that have the same service set identifier (SSID) the same roaming identifier, and/or the same roaming partnership.

A terminal device 110, 112 may establish a connection with any one of access nodes it has detected to provide a wireless connection within the neighbourhood of the terminal device. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and waiting for downlink frame transmissions from the access node and its own buffers for uplink frame transmissions.

The terminal devices 100, 112 may discover the access node 100 through a network discovery process. IEEE 802.11ai task group defines principles for fast initial link setup (FILS). One aspect of the principles is to enable faster and more precise AP and network discovery. Some principles may relate to passive scanning in which a scanning device, e.g. a STA, passively scans channels for any beacon, management, or advertisement frames. Other principles may relate to active scanning in which the scanning device actively transmits a scanning request message, e.g. a probe request message or a generic advertisement service (GAS) request, in order to query for present APs or networks. The probe request may also set some conditions that a responding device should fulfil in order to respond to the probe request. In some embodiments, the scanning device may be called a requesting device or a requesting apparatus. Responding devices may transmit scanning response messages, e.g. probe response messages, in response to the scanning request message, wherein the scanning response message may contain information on the responding device, its network, and other networks. Embodiments of the scanning enhancements described herein encompass the network discovery signalling, probe request-response processes, as well as GAS request-response processes.

Power consumption has always been an issue with all wireless networks and mobile communication. 802.11 specifications provide power-save mechanisms like a power save (PS) mode to save power when the STA is associated to an access node. By default, an associated STA is in active mode which enforces it to stay in an awake state when the STA is fully powered and able to transmit and receive frames with the access node. An associated STA may transition to the PS mode with explicit signalling and, while operating in the PS mode, it may save power by operating occasionally in a doze state. In the doze state, the STA is not able to transmit or receive frames but, on the other hand, power consumption of the STA is on a considerably lower level than in the awake state. The STA may wake up from the doze state to receive periodic beacon frames from the access node. While the STA is in the doze state, the access node buffers frames addressed to the STA. The access node transmits buffered multicast/groupcast frames after specific delivery traffic indication map (DTIM) beacon frames, when the STA is awake. Unicast frames may be transmitted only upon the STA in the PS mode has indicated that it has entered into the awake state. The access node indicates with the beacon frames (in a traffic indication map, TIM, field) whether it has frames buffered to the STA.

There are two main mechanisms for the STA in the PS mode to indicate transition to the awake state and to retrieve buffered frames from the access node. The mechanisms are use of PS-Poll frames and use of automatic power save delivery (APSD) and, specifically, unscheduled APSD (U-APSD). In the former, the STA transmits a PS-Poll frame to indicate to the access node that the STA shall be in the awake state until it has received one downlink frame. Once the access node has transmitted a frame to the STA from which it received the PS-Poll frame, the access node assumes that the STA is back in the doze state and continues buffering frames to the STA. When the STA uses the U-APSD scheme, the STA may retrieve multiple frames buffered in the access node by triggering a service period (SP) with an uplink trigger frame transmitted to the access node. Upon transmitting the trigger frame, the STA remains in the awake state until it has received from the access node a frame indicating an end of the service period (EOSP). The EOSP may be indicated by setting an EOSP bit set to a determined value in the frame.

Recent developments in 802.11 work groups have involved introduction of a new low-power radio interface called a wake-up radio (WUR). The WUR has been discussed in a WUR study group. A new task group, TGba, has been established and it will continue the work of the study group. One purpose of the new radio interface is to enable further power-savings by allowing a main radio (also known as a primary connectivity radio) interface used for data communication according to 802.11 specifications to doze for longer periods. The low-power radio interface is called in the study group a wake-up radio (WUR) receiver or a low-power WUR (LP-WUR) receiver, and it is considered to be a companion radio to the primary connectivity radio. A wireless device such as the STA may comprise both a WUR interface and the main 802.11 interface. An access node may comprise a wake-up transmitter and the main 802.11 interface. Accordingly, a device of the wireless network may include a wake-up radio interface and the main interface. It has been proposed that the purpose of the wake-up radio interface is only or mainly to wake-up the main radio interface when the access node has data to transmit to a dozing STA.

The wake-up radio interface may be designed such that it consumes less power than the main radio interface. The wake-up radio interface may employ a simpler modulation scheme than the main radio interface, e.g. the wake-up radio interface may use only on-off keying (OOK) while the main radio interface uses variable modulations schemes such as phase-shift keying (PSK) and (quadrature) amplitude modulation (QAM).

Since the main purpose of the wake-up radio interface is to wake up the main radio interface, the wake-up radio interface may be powered on when the main radio interface is powered off. A wake-up radio interface of the STA may be configured to receive and extract wake-up signals (WUS) in the form of radio frames transmitted by a wake-up radio interface of the access node. The wake-up radio interface of the STA may be capable of decoding the wake-up radio frames on its own without any help from the main radio interface. Accordingly, the wake-up radio interface may comprise, in addition to a radio frequency front-end receiver components, digital baseband receiver components and a frame extraction processor capable of decoding contents of a wake-up radio frame. The wake-up radio frame may comprise a destination address field indicating a STA that should wake up the main radio interface, and the frame extraction processor may perform decoding of the destination address from a received wake-up radio frame and determine whether or not the destination address is an address of the STA of the frame extraction processor. If yes, it may output a wake-up signal causing the main radio interface to wake up for radio communication with an access node.

Figure 1B:
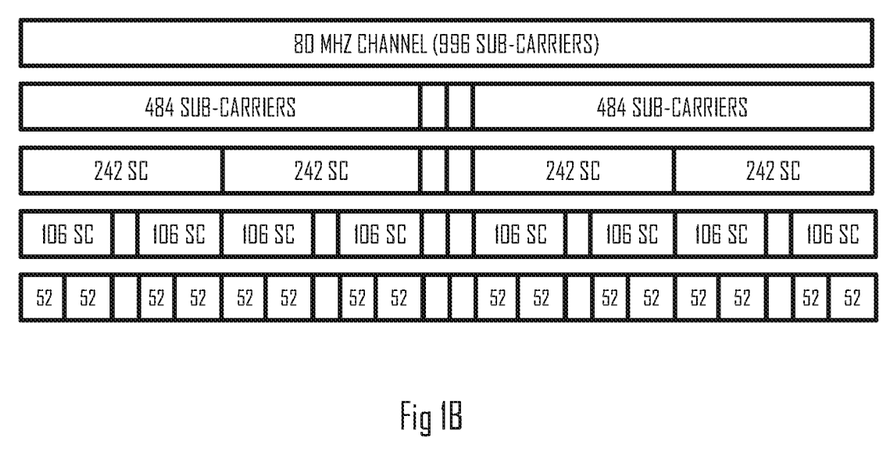
FIG. 1B illustrates sub-band division schemes available for a wireless network according to an embodiment of the invention.

FIG. 1B illustrates an example of a sub-channel division in a 802.11-based network. A frequency channel, e.g. an 80 Megahertz (MHz) frequency channel may be divided into sub-bands or sub-channels in a flexible manner. The wireless network may employ orthogonal frequency-division multiple access (OFDMA) where a radio carrier is composed of multiple sub-carriers, and the sub-carriers may be grouped to form the sub-bands. The sub-bands may be called OFDMA resource units. As illustrated in FIG. 1B, 996 sub-carriers of the 80 MHz frequency channel may be divided into two sub-bands of 484 sub-carriers with a guard band (illustrated as blank boxes between the sub-bands). Each of the two sub-bands may be allocated to different wireless devices for simultaneous frame transfer. The two 484-sub-carrier sub-bands may further be divided into smaller sub-bands of 242 sub-carriers, and each of the smaller sub-bands may further be divided into two sub-bands having 106 sub-carriers each. And yet again, the 106-sub-carrier sub-bands may be divided into smaller sub-bands of 52 sub-carriers, each of which may be divided into two 26-sub-carrier sub-bands. This scheme allows flexible frequency-multiplexing by providing sub-bands between 26 sub-carriers (about 2 MHz) and 996 sub-carriers (80 MHz). These numerical values are examples, and different values can be received with other sub-band divisions. Also, different sub-band division logic may be utilized. As illustrated by the blank boxes in FIG. 1B, guard bands in the form of null sub-carriers may be allocated between sub-bands.

In another embodiment where the frequency channel has another bandwidth, e.g. 40 MHz (498 sub-carriers), similar sub-band division may be applied to provide the flexible sub-band division and bandwidth allocation.

Figure 2:
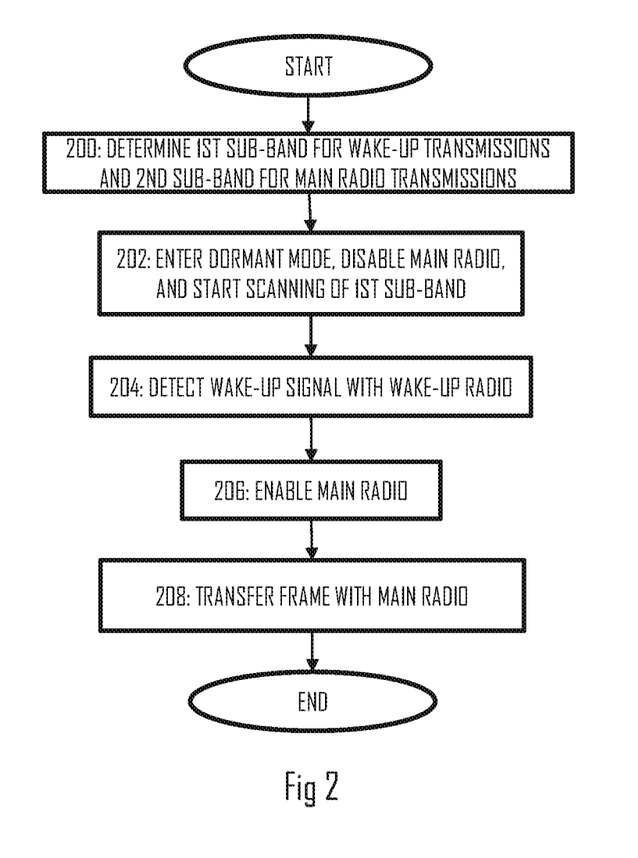
FIG. 2 illustrates a flow diagram of an embodiment for operating a wireless apparatus in a dormant mode where a main radio interface is disabled.
Figure 3:
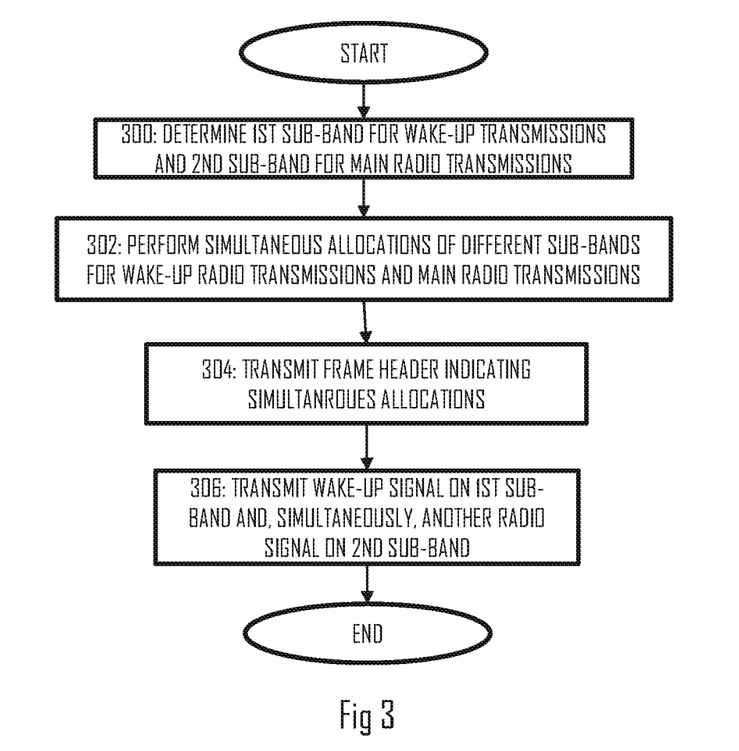
FIG. 3 illustrates a flow diagram of an embodiment for managing communication resources in an access node having multiple radio interfaces.

Detailed implementation of the use of the wake-up receiver and state synchronization between the access node and the STA is still under development in the work groups. FIGS. 2 and 3 illustrate a solution for determining frequency resources for the wake-up signal in the wireless network. FIG. 2 illustrates a process for a wireless device such as the STA 110, 112, while FIG. 3 illustrates a process for an access node 100. Referring to FIG. 2, the process comprises as performed by the wireless device: determining (block 200) a first sub-band of a frequency channel of a wireless network for wake-up radio transmissions according to a wake-up radio access technology and a second sub-band of the frequency channel, different from the first sub-band, for main radio transmissions according to another radio access technology; entering (block 202) a dormant mode where a main radio interface of the wireless device is disabled and a wake-up radio interface of the wireless device is configured to scan the first sub-band for a wake-up radio signal, wherein the main radio interface operates according to the other radio access technology; detecting (block 204), by using the wake-up radio interface, the wake-up radio signal on the first sub-band and, in response to said detecting, enabling (block 206) the main radio interface to transfer (block 208) a frame on the frequency channel.

Referring to FIG. 3, the process comprises as performed by the access node: determining to transmit frames on a frequency channel; determining (block 300) a first sub-band of the frequency channel for wake-up radio transmissions according to a wake-up radio access technology and a second sub-band of the frequency channel, different from the first sub-band, for main radio transmissions according to another radio access technology; performing (block 302) an allocation of the first sub-band for the wake-up radio transmissions and a simultaneous allocation of the second sub-band for the main radio transmissions; transmitting (block 304), using a main radio interface of the access node, a frame comprising a header indicating said allocations, and transmitting (block 306), after transmitting the header, a wake-up signal on the first sub-band by using a wake-up radio interface of the access node and, simultaneously, transmitting another radio signal on the second sub-band by using the main radio interface of the access node.

The embodiments of FIGS. 2 and 3 provide the radio resource for the wake-up signal in the frequency channel of the main radio interface, thus providing for coexistence between the two radio access technologies. It may also enable reduction in the structural complexity of the devices of the wireless network because at least some of radio frequency components such as an antenna may be utilized by both radio interfaces.

In an embodiment, the first sub-band is formed by the access node from a plurality of contiguous sub-carriers of the frequency channel.

In an embodiment, a bandwidth of the first sub-band is one, two, five, or ten MHz. A bandwidth of the frequency channel may be 20, 40, 80, or 160 MHz.

In an embodiment, the main radio interface may be considered as a first radio interface, and the wake-up radio interface may be considered as a second radio interface.

Figure 4:
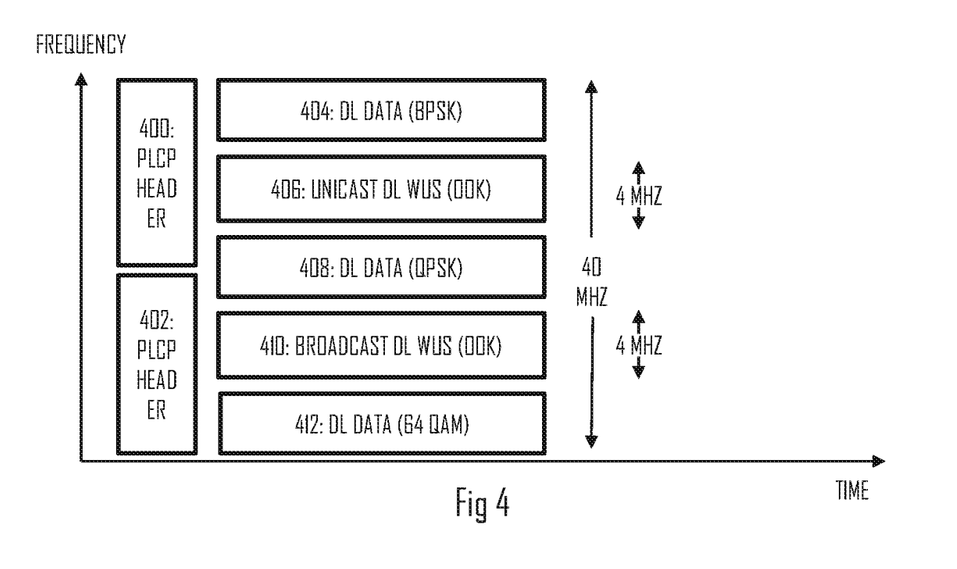
FIG. 4 illustrates a time-frequency representation of a frame transmitted in the wireless network according to an embodiment of the invention.

FIG. 4 illustrates a structure of a frame comprising a sub-band 406, 410 for the wake-up signal. The frame is in this embodiment a downlink frame transmitted by the access node. In the embodiment of FIG. 4, there is an allocated sub-band 410 for a broadcast wake-up signal and an allocated sub-band 406 for a unicast wake-up signal. A broadcast wake-up signal may be receivable by at least wireless devices that are not associated to the access node at the time of receiving the wake-up signal. A unicast wake-up signal may be receivable by at least wireless devices that are associated to the access node that transmits the frame. The frame may comprise an allocated sub-band for one or both of the broadcast wake-up signal and the unicast wake-up signal. In an embodiment, the frame comprises an allocated sub-band for a groupcast or multicast wake-up signal.

Referring to FIG. 4, the frame comprises a physical layer convergence protocol (PLCP) header 400, 402, and a PLCP preamble. The PLCP header may be transmitted and received by using the main radio interface employing a radio access technology different from the radio access technology of the wake-up radio interface. The PLCP preamble may comprise at least one synchronization sequence enabling receiving wireless devices to synchronize to the frame, and the PLCP header 400, 402 may carry information on the structure of the frame. The PLCP header according to 802.11 specifications may comprise a Very High Throughput (VHT) SIG-B field defining a sub-band structure of the frame. Referring to FIG. 1B, the SIG-B field may indicate a sub-band division scheme used in a payload portion of the frame. The SIG-B field may indicate allocation of one or more sub-bands 404, 408, 412 of the frame for downlink data and allocation of one or more sub-bands 406, 410 for the wake-up signal(s).

The SIG-B field may also indicate a modulation scheme for each sub-band. As illustrated in FIG. 4, a signal transmitted in each sub-band may have a distinct modulation scheme allocation. As described above, the payload data and the wake-up signals may be transmitted by using different modulation schemes and, additionally, different sub-bands carrying the downlink data may be assigned with different modulation schemes, e.g. binary PSK (BPSK), quadrature PSK (QPSK), or QAM. The access node may employ a fixed modulation scheme such as the OOK for the wake-up signal.

As illustrated in FIG. 4, the frequency channel of the frame may be 40 MHz and the sub-bands of the wake-up signals may be 4 MHz. Accordingly, the wake-up signals may be transmitted within the frequency resources of the frequency channel and between sub-bands allocated for transmissions of the main radio interface. In other words, the access node may simultaneously operate the main radio interface and the wake-up radio interface to transmit the wake-up signals and the other radio signals (data) simultaneously on parallel sub-bands of the frequency channel.

In an embodiment, the header indicates the allocation of the sub-band 406 and/or 410 for the wake-up radio transmissions by indicating that the sub-band is allocated to be received by no wireless device of the wireless network. In other words, from the perspective of the main radio interfaces in the wireless network, the sub-band(s) 406, 410 of the wake-up signals are allocated to no device and, accordingly, none of the main radio interfaces of the wireless network communicate on the sub-band(s) 406, 410 for the duration of the frame's payload portion. The sub-band(s) 406, 410 may thus be allocated as empty sub-bands in the PLCP header 400, 402, and the wake-up radio interface may be configured to carry out transmission of the wake-up signal(s) on these "empty" sub-bands.

Figure 5:
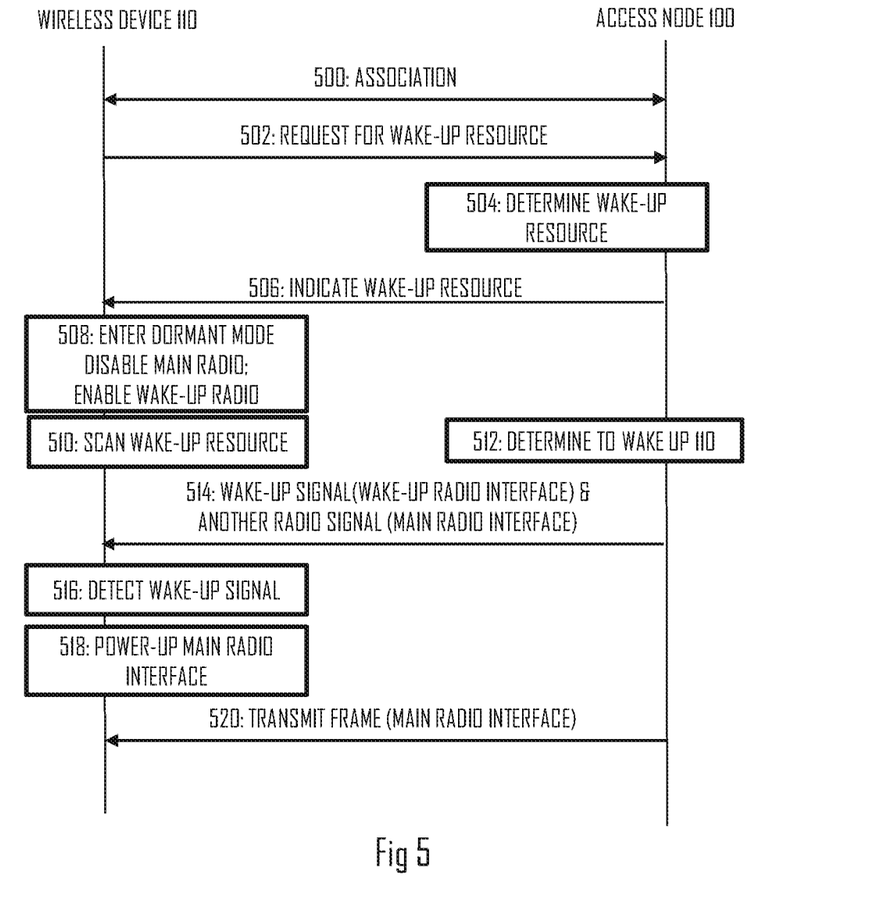
FIGS. 5 and 6 illustrate signalling diagrams of embodiments for determining frequency resources for a wake-up signal.
Figure 6:
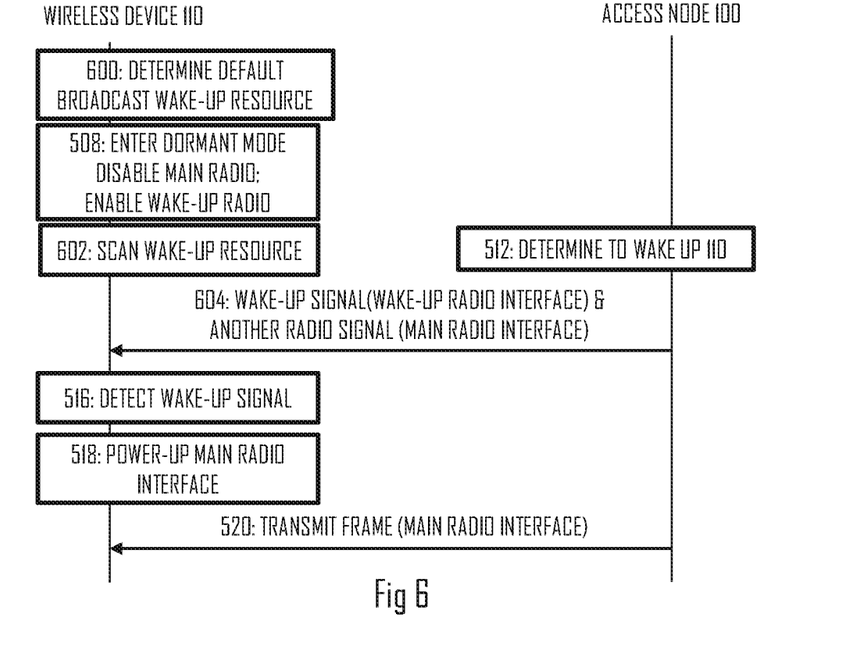
Figure 7:
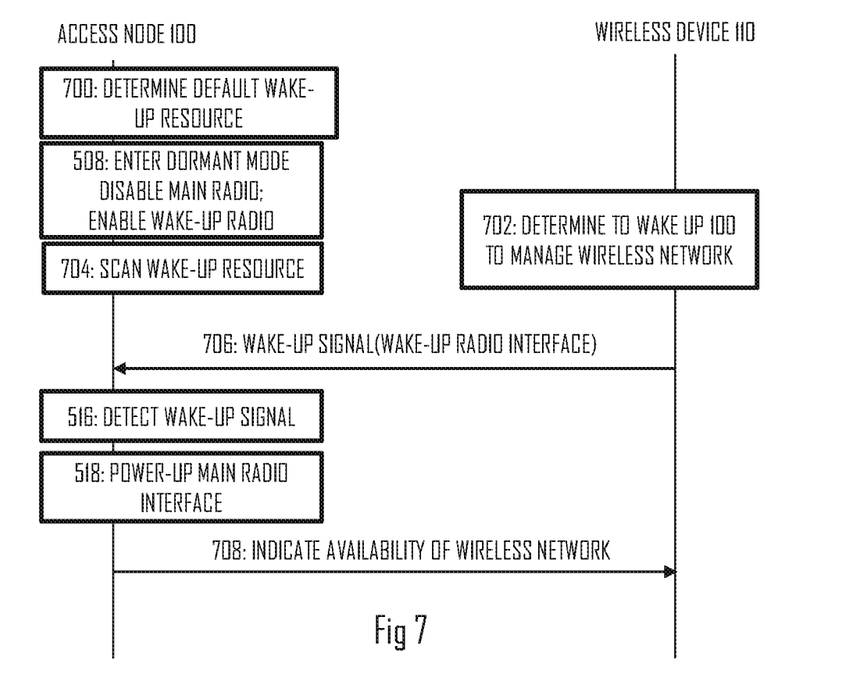
FIG. 7 illustrates a signalling diagram of an embodiment for waking up a dormant access node.

Let us now consider some embodiments of FIGS. 2 and 3 with reference to signalling diagrams of FIGS. 5 to 7. FIGS. 5 to 7 illustrate signalling between the wireless device 110 and the access node 100. FIG. 5 illustrates an embodiment where a sub-band is defined for unicast downlink wake-up signals, FIG. 6 illustrates an embodiment where a sub-band is defined for broadcast downlink wake-up signals, and FIG. 7 illustrates an embodiment where a sub-band is defined for uplink wake-up signals.

Referring to FIG. 5, the wireless device associates to the access node 100 in step 500. The association may be carried out in the above-described manner, e.g. according to 802.11 specifications. In steps 502 to 506, the wireless devices determines the sub-band for the wake-up signal by transmitting a wake-up radio resource allocation request to the access node (step 502). The request may be used by the wireless device 110 for requesting for resource allocation for the wake-up signal. In an embodiment, the request comprises an information element indicating a proposal of a sub-band for the wake-up signal in the form of a sub-band index and the request be arranged in a form of a field in a wake-up radio (WUR) switch frame. The WUR switch frame may be specified, for example, by using an action frame format of IEEE 802.11 specifications and defining a new frame or a new frame pair for the purpose of switching to/from the dormant mode. When indicating the switching to/from the dormant mode, the wireless device may also request for the resource allocation for the wake-up signal. Table 1 below illustrates an embodiment of contents of the WUR switch frame:

TABLE 1

| Frame control | ID | BSSID (RA) | TA | RAR | Mode | FCS |
|---|---|---|---|---|---|---|
| 2 octets | 2 octets | 6 octets | 6 octets | 1 octet | 1 octet | 4 octets |

The frame control field may specify the type and, optionally, a sub-type of the frame, e.g. the WUR switch frame. The ID field comprises an association identifier for the association between the wireless device and the access node. The BSSID (RA) field may comprise a receiver address for the frame indicating the BSS and the access node. The TA field comprises an address of the wireless device. The resource allocation request (RAR) field may indicate the request for the resource allocation for the wake-up signal and, in some embodiments, an index of a sub-band proposed for the allocation. The Mode field may indicate the following: one value indicates entering the dormant mode where the main radio interface is disabled and wake-up radio interface is enabled and another value indicates entering a power-save mode or an active mode where the main radio interface is enabled. A frame check sequence (FCS) may be used for error detection. Upon receiving the request in step 502, the access node determines a wake-up resource in the form of a sub-band for the wireless device. The access node may allocate a unique sub-band for the unicast wake-up signal associated with the wireless device and use a different sub-band for a unicast wake-up signal associated with another wireless device. In another embodiment, the access node may allocate the same sub-band at the same or different timing to a plurality of wireless devices and use the same sub-band for wake-up signals addressed to the plurality of wireless devices. For example, the wake-up signal may be a groupcast wake-up signal waking up a group of wireless devices. In the embodiment where the request comprises the proposal of the sub-band, the access node may first determine whether or not the proposed sub-band can be allocated to the unicast wake-up signal of the requesting wireless device 110. If the proposed sub-band cannot be allocated, the access node may select another sub-band allocation for the wake-up signal. Upon selecting the sub-band for the unicast wake-up signal of the wireless device 110, the access node may generate a wake-up radio resource allocation response message responding to the wake-up radio resource allocation request, the wake-up radio resource allocation response message carrying an information element indicating the selected sub-band for the unicast wake-up signal. The access node transmits the response in step 506 and, thus, indicates the selected sub-band of the unicast wake-up signal to the wireless device 110.

Upon receiving the response in step 506, the wireless device may enter (block 508) a dormant mode where the wireless device disables its main radio interface and enables the wake-up radio interface. The entering may be carried out immediately after receiving the response, for example if the wireless device has readily made the decision to use the dormant mode and waits for the resource allocation for the wake-up signal. However, the entering may be carried out at a later point after receiving the response. The wireless device may tune the wake-up radio interface to the sub-band indicated in the response received in step 506. In block 510, the wireless device scans the sub-band allocated to the unicast wake-up signal by using its wake-up radio interface while maintaining the main radio interface disabled. The main radio interface may be disabled for an extended period of time, e.g. for a duration longer than a beacon transmission interval of the access node 100, for example. Accordingly, the access node 100 may not be able to contact the wireless device through the main radio interfaces.

While the wireless device is in the dormant mode, the access node may transmit frames with other wireless devices through the main radio interface and use also the sub-band allocated to the unicast wake-up signal in block 504 in the frame transmissions. The wake-up radio interface may be tuned to scan for a wake-up signal having a different header and modulation, for example, and it cannot detect the transmissions of the main radio interface on the sub-band allocated to the unicast wake-up signal. In block 512, the access node may determine to wake up the wireless device 110. The determination may be based on receiving downlink data addressed to the wireless device 110, for example. In response to block 512, the access node may allocate the sub-band of the unicast wake-up signal as an empty allocation in a subsequent frame and use the wake-up radio interface to transmit the unicast wake-up signal to the wireless device 110 on the sub-band in step 514. Simultaneously in step 514, the access node may use its main radio interface to transmit data or other messages on other sub-bands of the frame.

Since the wake-up radio interface of the wireless device is tuned to the sub-band of the unicast wake-up signal, the wireless device is capable of detecting the unicast wake-up signal on the sub-band (block 516). Upon detecting the unicast wake-up signal addressed by the access node to the wireless device in block 516, the wireless device powers up its main radio interface in block 518. Upon enabling the main radio interface, the wireless device is capable of receiving a downlink frame transmitted by the access node with its main radio interface in step 520.

In another embodiment, the RAR field of Table 1 is comprised in an association request message, and the access node may respond to the resource allocation request in an association response message. In yet another embodiment, a dedicated action frame pair is designed for the resource allocation request message and the resource allocation response message. In yet another embodiment, the access node determines the sub-band(s) for the unicast wake-up signals and indicates the determined sub-band(s) in a beacon message or another broadcast message. In such an embodiment, the resource allocation request-response procedure may not be necessary.

As described above, the sub-band for the unicast wake-up signal may be negotiated between the wireless device and the associated access node before the wireless device enters the dormant mode. Additionally, or alternatively, a fixed sub-band may be specified for the wake-up signal. The fixed sub-band may be utilized to wake up at least those devices that are not associated to the access node but that the access node wants to wake up to receive a frame, e.g. to receive a management frame carrying out priority information. The fixed sub-band may be specified for each frequency channel of the wireless network in system specifications of the wireless network, e.g. in the 802.11 specifications. FIG. 6 illustrates an embodiment of using the fixed sub-band for the broadcast wake-up signal.

Referring to FIG. 6, the wireless device 110 may determine the fixed or default sub-band for a broadcast wake-up signal in block 600. The wireless device may read the sub-band from a memory of the wireless device 110 storing the sub-band in a permanent manner. In block 508, the wireless device enters the dormant mode, disables the main radio interface, and tunes the wake-up radio interface to scan the sub-band of the broadcast wake-up signal (block 602). Upon determining to wake up the non-associated wireless devices or all dormant wireless devices of the wireless network, the access node may transmit the wake-up signal on the sub-band allocated to the broadcast wake-up signal (block 604). Upon detecting the wake-up signal in block 516 by the wireless device, the process may proceed as described above in connection with FIG. 5.

The broadcast wake-up signal may distinguish from the unicast wake-up signal with the different sub-band allocation and a different recipient address. The unicast wake-up signal may be addressed to a single recipient while the broadcast wake-up signal may be addressed to a broadcast address.

FIG. 7 illustrates an embodiment where the access node 100 is in the dormant mode and waken up by the wireless device. An access node serving no wireless devices may determine to doze to reduce power consumption and interference towards other wireless networks. The wake-up radio interfaces may be used to activate such a dormant access node to provide wireless access. As described above with the broadcast wake-up signals, there may be specified a fixed sub-band for an uplink wake-up signal.

Referring to FIG. 7, the access node 100 may determine the fixed or default sub-band for an uplink wake-up signal in block 600. The access node may read the sub-band from a memory of the access node storing the sub-band in a permanent manner. In block 508, the access node enters the dormant mode, disables the main radio interface, and tunes the wake-up radio interface to scan the sub-band of the uplink wake-up signal (block 704). A wireless device searching for a wireless network and requiring establishment of the wireless network may determine to wake up the dormant access node in block 702. Upon determining to wake up the access node, the wireless device may transmit the wake-up signal on the sub-band allocated to the uplink wake-up signal (block 706). The wireless device 110 may transmit the uplink wake-up signal by using the wake-up radio interface such that the wake-up signal is the only transmission at the time. In other words, the wireless device does not necessarily apply the frequency-multiplexing between the wake-up radio interface (the uplink wake-up signal) and the main radio interface (another radio signal).

The access node may detect the uplink wake-up signal and power up its main radio interface in a similar manner as described above for the wireless device in connection with blocks 516 and 518. Upon powering up the main radio interface, the access node may broadcast a frame indicating the availability of the wireless network managed by the access node (step 708), e.g. a beacon frame. Upon detecting the frame, the wireless device 110 may start association to the access node. Thereafter, the process may proceed according to the embodiment of FIG. 5 from step 500 onwards, for example.

Instead of using the fixed sub-band for the wake-up signal, a fixed frequency hopping pattern may be specified for the broadcast wake-up signal or the uplink wake-up signal. In this case, the device transmitting the wake-up signal may employ the frequency hopping pattern in a transmission of the wake-up signal. A signal scanning for the wake-up signal may scan one, multiple, or all of the sub-bands of the frequency hopping pattern.

Figure 8:
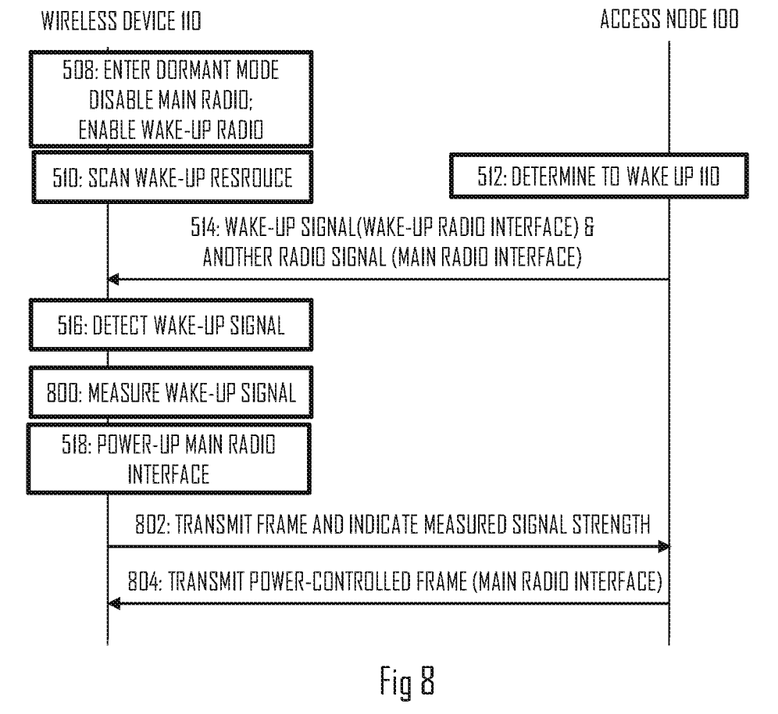
FIG. 8 illustrates an embodiment for utilizing transmit power control by using a wake-up radio interface.

The access node 100 may employ transmit power control in its frame transmissions. For the purpose of the transmit power control, the wireless device 110 may be configured to measure a received signal strength of a downlink signal received from the access node 100 and to indicate the measured signal strength to the access node 100. FIG. 8 illustrates an embodiment where the measurement is carried out from the received wake-up signal, e.g. the unicast wake-up signal or the broadcast wake-up signal. FIG. 8 is described as an embodiment of FIG. 5 but it is directly applicable to the embodiment of FIG. 6 as well.

Referring to FIG. 8, blocks 508 to 516 may be carried out in the above-described manner. Upon detecting the wake-up signal causing the wireless device to power up its main radio interface, the wireless device may measure the received signal strength of the received wake-up signal (block 800). The wireless device may store the received wake-up signal until it has made the determination of whether or not the wireless device shall power up its main radio interface. The received signal strength may be measured by using state-of-the-art signal measurement techniques, and a measurement result may be a received signal strength indicator (RSSI) or another metric representing the received signal strength of the wake-up signal received through the wake-up radio interface of the wireless device.

Upon powering up the main radio interface, the wireless device may generate an uplink frame and insert the measurement result in the uplink frame transmitted by the wireless device to the access node in step 802. The uplink frame may be a trigger frame that indicates to the access node that the wireless device has powered up its main radio interface and is ready for downlink transmissions. The trigger frame may be used by the wireless device to acknowledge the reception of the wake-up signal. In another embodiment, the uplink frame is another uplink frame, and/or the uplink frame may carry data. Upon receiving the uplink frame in step 802, the access node may determine a transmit power mapped to the measurement result indicated by the wireless device and transmit a downlink frame to the wireless device by using the determined transmit power (step 804).

Figure 9:
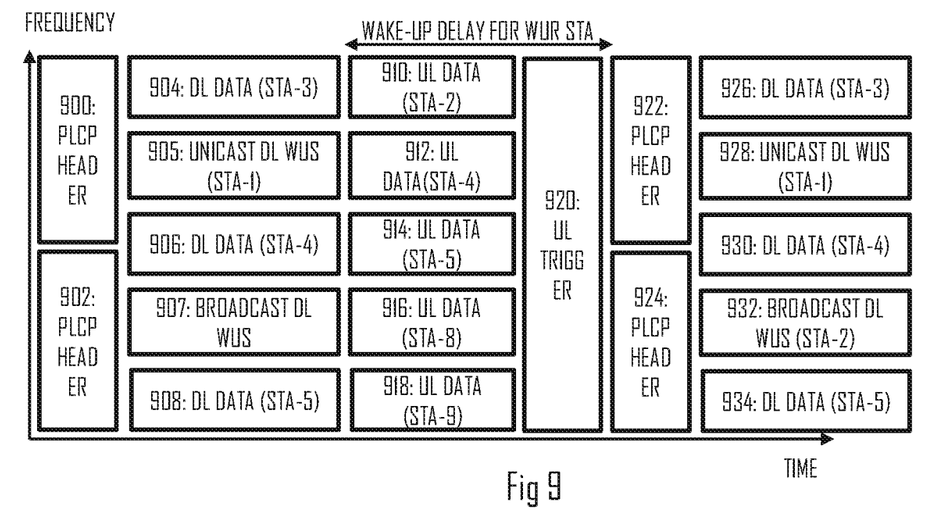
FIG. 9 illustrates another time-frequency representation of frames transmitted in the wireless network according to an embodiment of the invention.

FIG. 9 illustrates another embodiment of multiplexed frame transmissions in the wireless network of the access node 100. In this example, the number of associated wireless devices (STA-1 to STA-9) is higher than in the previous examples to demonstrate the multiplexing. The frequency channel illustrated in FIG. 9 may be a 40 MHz frequency channel, as in FIG. 4. Referring to FIG. 9, the access node may transmit a downlink frame comprising the PLCP headers 900 and 902 indicating the sub-band allocations for a downlink part (904 to 908) of the frame and subsequent uplink frames (910 to 918).

The PLCP headers 900, 902 may indicate allocations of sub-bands for downlink data addressed to different recipients. For example, the PLCP headers may indicate that the sub-band 904 is allocated to the STA-3, sub-band 906 is allocated to the STA-4, and the sub-band 908 is allocated to the STA-5. Upon decoding the PLCP header, each of the wireless devices STA-3, STA-4, and STA-5 tunes to receive downlink data from the respective sub-bands. Additionally, the PLCP headers 900, 902 may indicate that the frame comprises an empty allocation on the sub-bands 905, 907. Additionally, the PLCP headers 900, 902 may allocate uplink resources on the sub-bands 910 to 918 to wireless devices STA-2, STA-4, STA-5, STA-8, and STA-9. The PLCP headers 900, 902 may also indicate allocation of a resource 920 for an uplink trigger signal.

After the headers 900, 902, the access node may transmit the downlink data on the sub-bands 904, 906, and 908 by using its main radio interface, a unicast wake-up signal on the sub-band 905 by using its wake-up radio interface, and a broadcast wake-up signal on the sub-band 907 by using its wake-up radio interface. Thereafter, the access node may tune to receive uplink data from the wireless devices STA-2, STA-4, STA-5, STA-8, and STA-9 on the sub-bands 910 to 918. After the uplink allocations 910 to 918, the STA-1 receiving the unicast wake-up signal on the sub-band 905 or any other dormant wireless device receiving the broadcast wake-up signal on the sub-band 907 may transmit an uplink trigger signal in the resource 920 to indicate activation of the main radio interface to the access node. As a consequence, the access node may then perform a resource allocation for downlink data for the wireless device(s) that sent the uplink trigger signal. In the subsequent frame comprising the headers 922, 924, the access node may indicate sub-band allocations for downlink data addressed to the wireless device(s). For example, the subsequent PLCP headers 922, 924 may comprise an allocation of a sub-band 928 for the STA-1 that was dormant during the previous frame. Other sub-bands 926, 930 to 934 may be allocated to other STAs and/or to no receiver (empty allocation).

As illustrated in FIG. 9, the duration of the uplink frame transmissions in blocks 910 to 920 provide a wake-up delay for a STA that was dormant at the time of receiving the wake-up signal on the sub-band 905 or 907.

Figure 10:
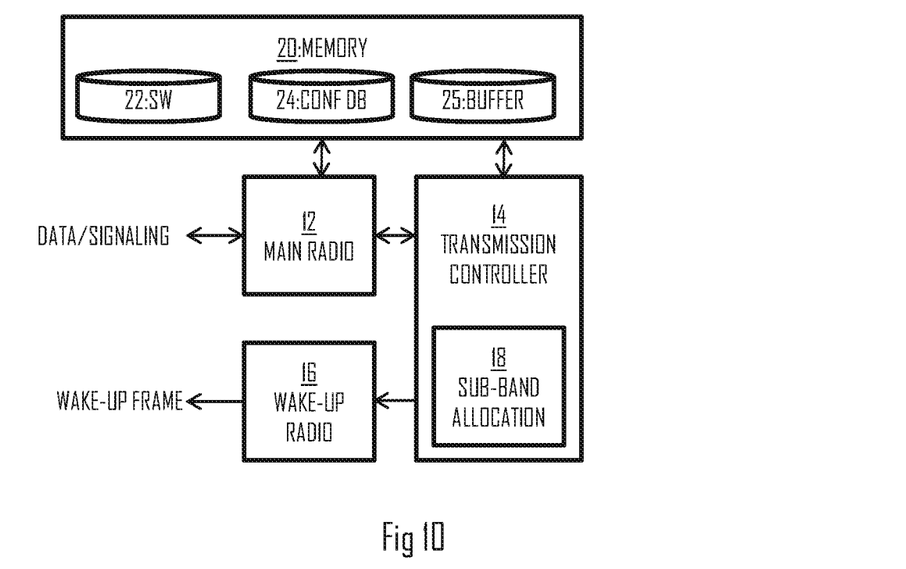
FIGS. 10 and 11 illustrate block diagrams of apparatuses according to some embodiments of the invention.

FIG. 10 illustrates an embodiment of a structure of the above-mentioned functionalities of the apparatus executing the process of FIG. 3 or any one of the embodiments performed by the access node 100. The apparatus may be the access node 100. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices. The apparatus may be an electronic device comprising electronic circuitries for realizing the embodiments of the present invention.

Referring to FIG. 10, the apparatus may comprise the above-described main radio interface 12 configured to provide the apparatus with capability for bidirectional communication with wireless devices in a wireless network managed by the apparatus. The main radio interface 12 may operate according to 802.11 specifications, for example. The main radio interface 12 may comprise analogue radio communication components and digital baseband processing components for processing transmission and reception signals. The main radio interface 12 may support multiple modulation formats.

The apparatus may further comprise the above-described wake-up radio interface 16 comprising a transmission circuitry for generating and transmitting the wake-up frames. The wake-up radio interface 16 may be configured for transmission only but, in some embodiments, the wake-up radio interface may enable uplink communications where the wake-up radio interface 16 has reception capability. The wake-up radio interface 16 may comprise analogue radio communication components and digital baseband processing components for processing transmission and reception signals. The wake-up radio interface 16 may support a single modulation scheme only, e.g. the on-off keying.

The main radio interface 12 and the wake-up radio interface 16 may comprise radio interface components providing the apparatus with radio communication capability within one or more wireless networks. The radio interface components may comprise standard well-known components such as an amplifier, filter, frequency-converter, (de)modulator, and encoder/decoder circuitries and one or more antennas.

The apparatus may further comprise a memory 20 storing one or more computer program products 22 configuring the operation of at least one processor of the apparatus, e.g. a transmission controller 14 described below. The memory 20 may further store a configuration database 24 storing operational configurations of the apparatus. The configuration database may, for example, store sub-band division schemes available to the apparatus when performing the sub-band allocations according to FIG. 3. The memory 20 may further store the buffer 25 storing downlink data addressed to the wireless devices associated to the apparatus.

The apparatus may further comprise a transmission controller 14 configured to control the operation of the main radio interface 12 and the wake-up radio interface 16. The transmission controller 14 may selectively use the main radio interface 12 and/or the wake-up radio interface 16 to communicate with the wireless devices associated to the apparatus and, additionally, with wireless devices not associated to the apparatus. The transmission controller may, for example, control the operation of the access node in the embodiments of FIGS. 3 to 9.

The transmission controller 14 may comprise a sub-band allocation circuitry 18 configured to carry out sub-band allocations according to frequency-multiplexing principles, as described above. For example, when the transmission controller 14 determines to wake-up at least one of dormant wireless devices, the sub-band allocation circuitry may allocate one or more sub-bands of a frame on a frequency channel to one or more wake-up signals. The transmission controller 14 may then control the wake-up radio interface 16 to transmit the wake-up signal(s) in the allocated one or more sub-bands while the main radio interface 12 simultaneously transmits downlink data on other sub-bands of the frequency channel in the frame. When there is no need to transmit a wake-up signal, the sub-band allocation circuitry 18 may allocate the sub-bands of the frame for data transmission and/or transmission of control or management information.

In an embodiment, the apparatus comprises at least one processor and at least one memory 20 including a computer program code 22, wherein the at least one memory and the computer program code are configured, with the at least one processor, to cause the apparatus to carry out the functionalities of the access node according to any one of the embodiments of FIGS. 3 to 9. According to an aspect, when the at least one processor executes the computer program code, the computer program code causes the apparatus to carry out the functionalities according to any one of the embodiments of FIGS. 3 to 9. According to another embodiment, the apparatus comprises the at least one processor and at least one memory 20 including a computer program code 22, wherein the at least one processor and the computer program code 22 perform the at least some of the functionalities of the access node according to any one of the embodiments of FIGS. 3 to 9. Accordingly, the at least one processor, the memory, and the computer program code form processing means for carrying out embodiments of the present invention in the access node. According to yet another embodiment, the apparatus carrying out the embodiments of the invention in the access node comprises a circuitry including at least one processor and at least one memory 20 including computer program code 22. When activated, the circuitry causes the apparatus to perform the at least some of the functionalities of the access node according to any one of the embodiments of FIGS. 3 to 9.

Figure 11:
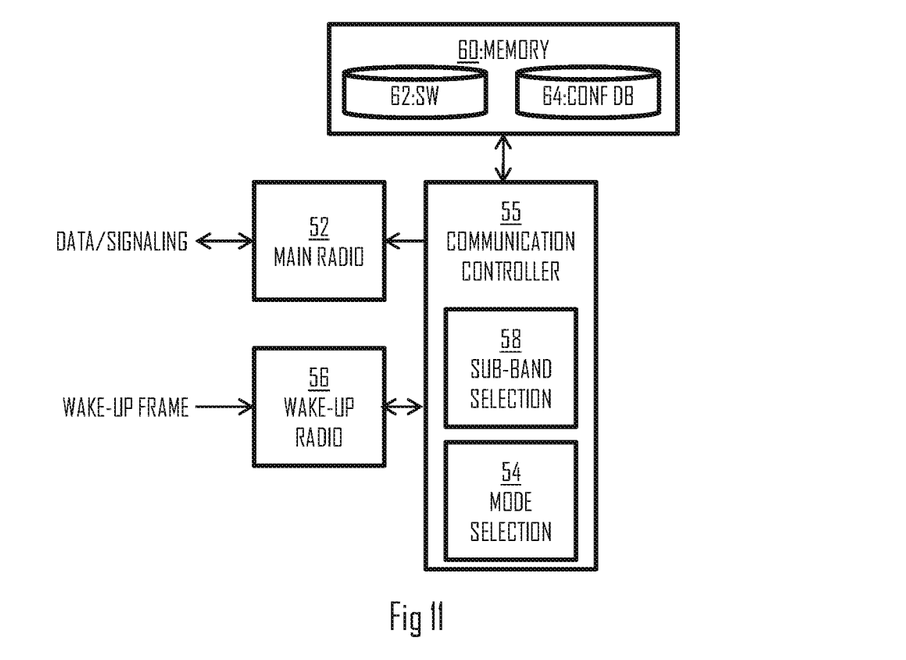

FIG. 11 illustrates an embodiment of a structure of the above-mentioned functionalities of the apparatus executing the process of FIG. 2 or any one of the embodiments performed by the wireless device 110. The apparatus may be the wireless device 110. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices. The apparatus may be an electronic device comprising electronic circuitries for realizing the embodiments of the present invention.

Referring to FIG. 11, the apparatus may comprise the above-described main radio interface 52 configured to provide the apparatus with capability for bidirectional communication with an access node operating a wireless network. The main radio interface 12 may operate according to 802.11 specifications, for example. The main radio interface 12 may comprise analogue radio communication components and digital baseband processing components for processing transmission and reception signals. The main radio interface 12 may support multiple modulation formats.

The apparatus may further comprise the above-described wake-up radio interface 56 comprising a reception circuitry for receiving the wake-up frames. The wake-up radio interface 56 may be configured for reception only but, in some embodiments, the wake-up radio interface may enable uplink communications where the wake-up radio interface 56 has transmission capability. The wake-up radio interface 56 may comprise analogue radio communication components and digital baseband processing components for processing transmission and reception signals. The wake-up radio interface 16 may support a single modulation scheme only, e.g. the on-off keying.

The main radio interface and the wake-up radio interface may comprise radio interface components providing the apparatus with radio communication capability within one or more wireless networks. The radio interface components may comprise standard well-known components such as an amplifier, filter, frequency-converter, (de)modulator, and encoder/decoder circuitries and one or more antennas.

The apparatus may further comprise a memory 60 storing one or more computer program products 62 configuring the operation of at least one processor of the apparatus, e.g. a mode selection circuitry 54 described below. The memory 60 may further store a configuration database 64 storing operational configurations of the apparatus. The configuration database may, for example, store the current operational mode of the apparatus, e.g. a dormant mode or an active mode.

The apparatus may further comprise a communication controller 55 configured to control operational modes and general communication in the wireless device. The communication controller 55 may comprise a mode selection circuitry 54 configured to switch the main radio interface 52 and the wake-up radio interface on and off according to the current operational mode of the apparatus. In a dormant mode, the mode selection circuitry may disable the main radio interface 52 and enable the wake-up radio interface. Upon receiving the wake-up signal in the dormant mode through the wake-up radio interface 56, the mode selection circuitry 54 may power-up the main radio interface and switch to an active mode where the main radio interface is available for frame transmissions. The mode selection circuitry 54 may further control the main radio interface to signal the mode transitions to the associated access node.

The communication controller 55 may further comprise a sub-band selection circuitry 58 configured to determine a sub-band allocated to a signal or a message transmitted/received by the apparatus. For example, the sub-band selection circuitry 58 may determine the sub-band of the wake-up signal according to any one of the above-described embodiments and configure the wake-up radio interface to scan the determined sub-band for a wake-up signal when the main radio interface is disabled. The sub-band selection circuitry 58 may additionally determine sub-band allocations of the apparatus and control the main radio interface to communicate (transmit or receive) frames on the sub-band(s) allocated to the apparatus.

In an embodiment, the apparatus comprises at least one processor and at least one memory 60 including a computer program code 62, wherein the at least one memory and the computer program code are configured, with the at least one processor, to cause the apparatus to carry out the functionalities of the wireless device according to any one of the embodiments of FIGS. 2 and 4 to 9. According to an aspect, when the at least one processor executes the computer program code, the computer program code causes the apparatus to carry out the functionalities according to any one of the embodiments of FIGS. 2 and 4 to 9. According to another embodiment, the apparatus comprises the at least one processor and at least one memory 20 including a computer program code 22, wherein the at least one processor and the computer program code 22 perform the at least some of the functionalities of the wireless device according to any one of the embodiments of FIGS. 2 and 4 to 9. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor and at least one memory 20 including computer program code 22. When activated, the circuitry causes the apparatus to perform the at least some of the functionalities of the wireless device according to any one of the embodiments of FIGS. 2 and 4 to 9.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in connection with FIGS. 2 to 9 may also be carried out in the form of one or more computer processes defined by one or more computer programs. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:
1. A method comprising:
   determining, by an access node of a wireless network, to transmit frames on a frequency channel;
   determining, by the access node, a first sub-band of the frequency channel for wake-up radio transmissions according to a wake-up radio access technology and a second sub-band of the frequency channel, different from the first sub-band, for other radio transmissions according to another radio access technology, wherein the first sub-band and second sub-band are parallel sub-bands of the frequency channel;

performing, by the access node, an allocation of the first sub-band for the wake-up radio transmissions and a simultaneous allocation of the second sub-band for the other radio transmissions;

transmitting, by the access node, using another radio interface of the access node operating according to said another radio access technology, a frame comprising a header indicating said simultaneous allocation of the first sub-band for the wake-up radio transmissions and the second sub-band for the other radio transmissions; and transmitting, by the access node, after transmitting the header, a wake-up signal on the first sub-band using a wake-up radio interface of the access node operating according to the wake-up radio access technology and, simultaneously, transmitting another radio signal on the second sub-band by using the another radio interface of the access node.

2. The method of claim 1, wherein the header indicates the allocation of the first sub-band for the wake-up radio transmissions by indicating that the first sub-band is allocated to be received by no wireless device of the wireless network.

3. The method of claim 1, wherein the wake-up signal is transmitted by using a different modulation than the another radio signal.

4. The method of claim 3, wherein the wake-up signal is modulated by using an on-off keying modulation.

5. The method of claim 1, further comprising:
performing, by the access node after transmitting the frame, a further allocation of the first sub-band and the second sub-band for the another radio transmissions;
transmitting, by the access node, using the another radio interface of the access node, a further frame comprising a further header indicating said further allocation, and
transmitting, by the access node after transmitting the further header, a further radio signal on the first sub-band and the second sub-band by using the another radio interface of the access node.

6. The method of claim 1, wherein the another radio technology is based on IEEE 802.11 specifications.

7. An apparatus for an access node, the apparatus comprising:
at least one processor; and
at least one memory including a computer program code, wherein the at least one memory and the computer program code are configured, with the at least one processor, to cause the apparatus to:
determine to transmit frames on a frequency channel;
determine a first sub-band of the frequency channel for wake-up radio transmissions according to a wake-up radio access technology and a second sub-band of the frequency channel, different from the first sub-band, for other radio transmissions according to another radio access technology, wherein the first sub-band and second sub-band are parallel sub-bands of the frequency channel;
perform an allocation of the first sub-band for the wake-up radio transmissions and a simultaneous allocation of the second sub-band for the other radio transmissions;
use another radio interface of the access node operating according to said another radio access technology to transmit a frame comprising a header indicating said simultaneous allocation of the first sub-band for the wake-up radio transmissions and the second sub-band for the other radio transmissions; and
use, after transmitting the header, a wake-up radio interface of the access node operating according to the wake-up radio access technology to transmit a wake-up signal on the first sub-band and, simultaneously, use the another radio interface of the access node to transmit another radio signal on the second sub-band.

8. The apparatus of claim 7, wherein the at least one memory and the computer program code are configured, with the at least one processor, to cause the apparatus to form the first sub-band from a plurality of contiguous sub-carriers of the frequency channel.

9. The apparatus of claim 7, wherein a bandwidth of the first sub-band is equal to or less than ten Megahertz, and wherein a bandwidth of the frequency channel is 20 Megahertz.

10. The apparatus of claim 7, wherein the at least one memory and the computer program code are configured, with the at least one processor, to cause the apparatus to determine the first sub-band of the frequency channel by performing at least the following:
receiving, from a wireless device, a wake-up radio resource allocation request requesting for resource allocation for the wake-up signal; and
transmit, in response to the wake-up radio resource allocation request, a wake-up radio resource allocation response indicating the first sub-band to the wireless device.

11. The apparatus of claim 7, wherein the at least one memory and the computer program code are configured, with the at least one processor, to cause the apparatus to transmit the wake-up signal by using a different modulation than the another radio signal.

12. The apparatus of claim 11, wherein the at least one memory and the computer program code are configured, with the at least one processor, to cause the apparatus to modulate the wake-up signal by using an on-off keying modulation.

13. The apparatus of claim 7, wherein the at least one memory and the computer program code are configured, with the at least one processor, to cause the apparatus to:
perform, after transmitting the frame, a further allocation of the first sub-band and the second sub-band for the another radio transmissions;
using the another radio interface of the access node to transmit a further frame comprising a further header indicating said further allocation, and
using the another radio interface of the access node to transmit, after transmitting the further header, a further radio signal on the first sub-band and the second sub-band.

14. The apparatus of claim 7, wherein the another radio technology is based on IEEE 802.11 specifications.

* * * * *

UNITED STATES PATENT AND TRADEMARK OFFICE
CERTIFICATE OF CORRECTION

PATENT NO. : 11,330,520 B2
APPLICATION NO. : 16/473017
DATED : May 10, 2022
INVENTOR(S) : Olli Alanen et al.

Page 1 of 1

It is certified that error appears in the above-identified patent and that said Letters Patent is hereby corrected as shown below:

In the Drawings

In sheet 3 of 7, Fig. 3., and on the Title Page, the illustrative print figure, reference numeral 304, Line 2, delete "SIMULTANROUES" and insert -- SIMULTANEOUS --, therefor.

In sheet 6 of 7, FIG. 8, reference numeral 510, Line 1, delete "RESROUCE" and insert -- RESOURCE --, therefor.

In the Claims

In Column 17, Line 35, Claim 5, delete "node" and insert -- node, --, therefor.

Signed and Sealed this
Sixteenth Day of May, 2023

Katherine Kelly Vidal
*Director of the United States Patent and Trademark Office*